United States Patent [19]

Maynard

[11] Patent Number: 4,977,660
[45] Date of Patent: Dec. 18, 1990

[54] TOOL FOR REMOVING AND INSTALLING AN AUTOMOTIVE UNIVERSAL JOINT

[76] Inventor: Wade Maynard, 4281 Wakonda Dr., Norwalk, Iowa 50211

[21] Appl. No.: 435,250

[22] Filed: Nov. 13, 1989

[51] Int. Cl.$^5$ .............................................. B23P 19/02
[52] U.S. Cl. ........................................ 29/251; 29/257
[58] Field of Search ................. 29/251, 252, 434, 464, 29/525, 559, 244

[56] References Cited

U.S. PATENT DOCUMENTS

| | | | |
|---|---|---|---|
| 2,184,356 | 12/1939 | Lindgren | 29/251 |
| 3,230,617 | 1/1966 | Spiess et al. | 29/252 |
| 3,786,544 | 1/1974 | Ferguson | 29/251 |
| 4,305,195 | 12/1981 | Gould | 29/251 |
| 4,558,502 | 12/1985 | Gossmann et al. | 29/252 |

FOREIGN PATENT DOCUMENTS 1604192 12/1981 United Kingdom ................. 29/257

*Primary Examiner*—Robert C. Watson
*Attorney, Agent, or Firm*—Jerome Goldberg

[57] ABSTRACT

A tool for removing a coupling cap when disconnecting the universal joint from a yoke, and installing a coupling cap when connecting a universal joint to a yoke. The tool includes a pair of anvils spaced apart for supporting the universal joint and yoke in a fixed vertical position. When the tool is used for disconnecting the U-joint, a rod is provided including a bottom end having an outer lip encircling the mouth of a bore extending inward therefrom. The lip impacts the portion of the yoke circumscribing the opening containing the cap in press fit association with the U-joint and the yoke in response to a downward force acting on the rod, to cause the cap to dislodge from the opening and move upward into the bore of the rod. When the tool is used for connecting the U-joint to the yoke, the rod is provided including a piston at the bottom end thereof. The piston pushes the cap into a press fit association in the space in the yoke opening between the side surface defining the opening and a projection of the U-joint, in response to a downward force acting on the rod. An alignment support urges the U-joint upward as the cap is being pushed downward.

11 Claims, 4 Drawing Sheets

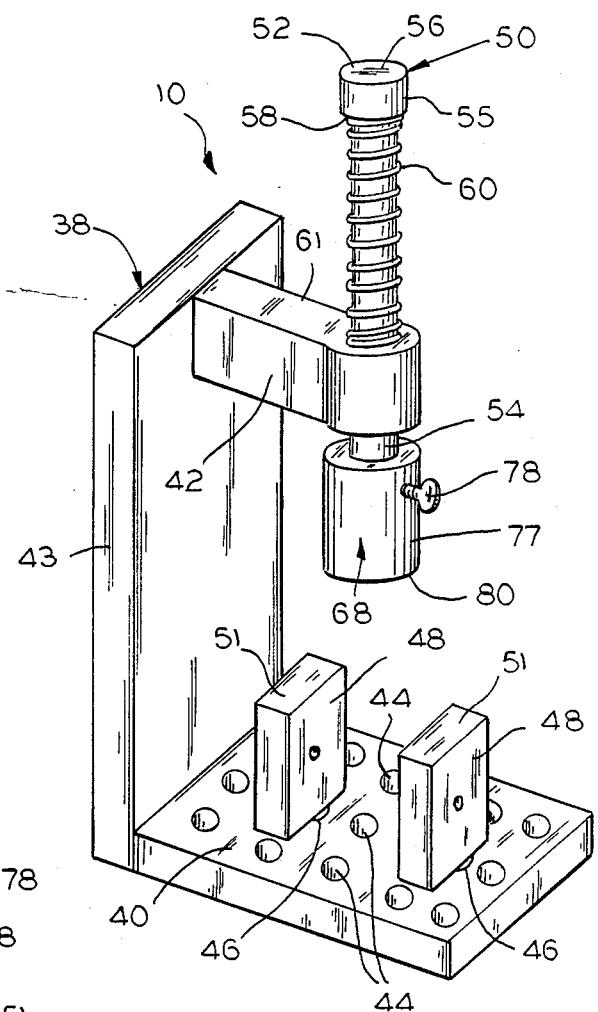
FIG. 1
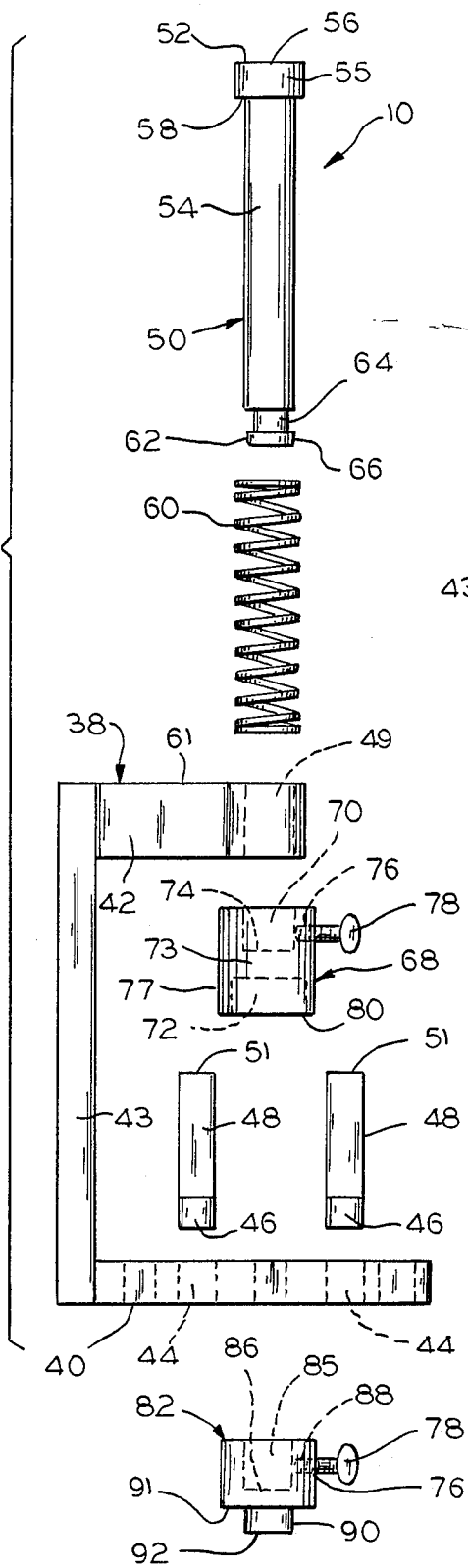
FIG. 2
FIG. 3
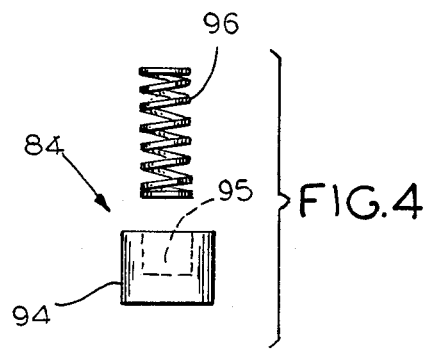
FIG. 4

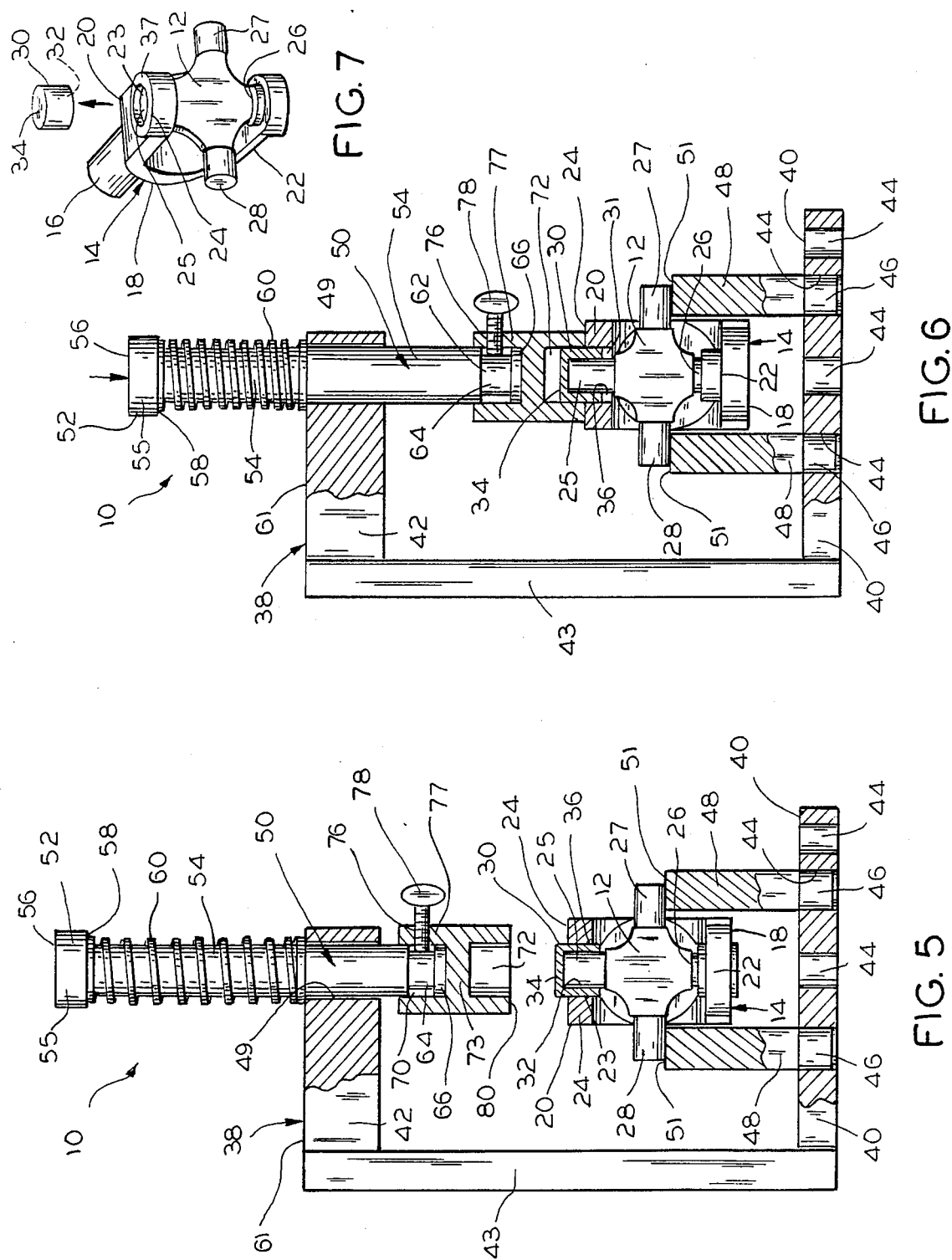

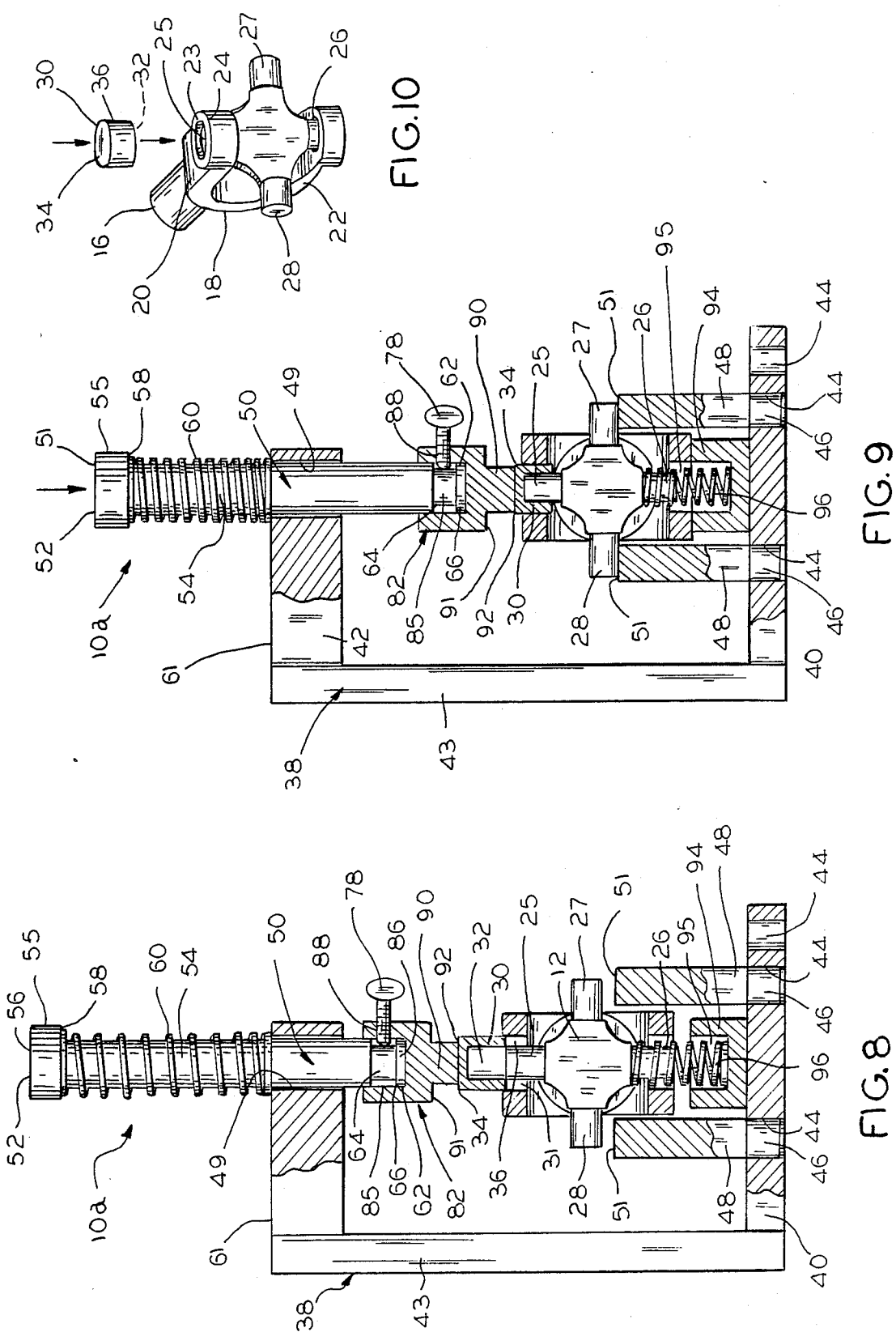

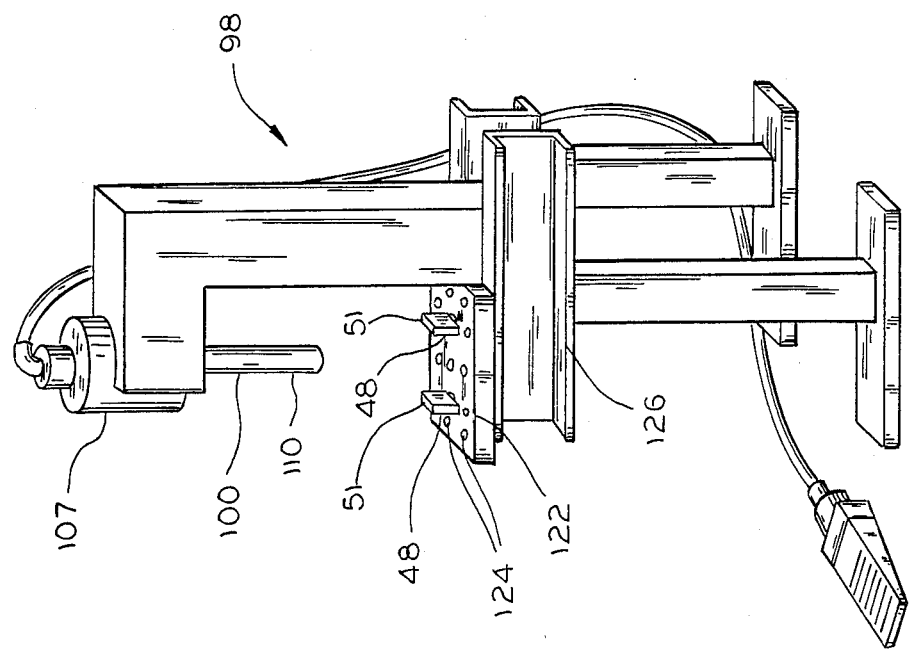
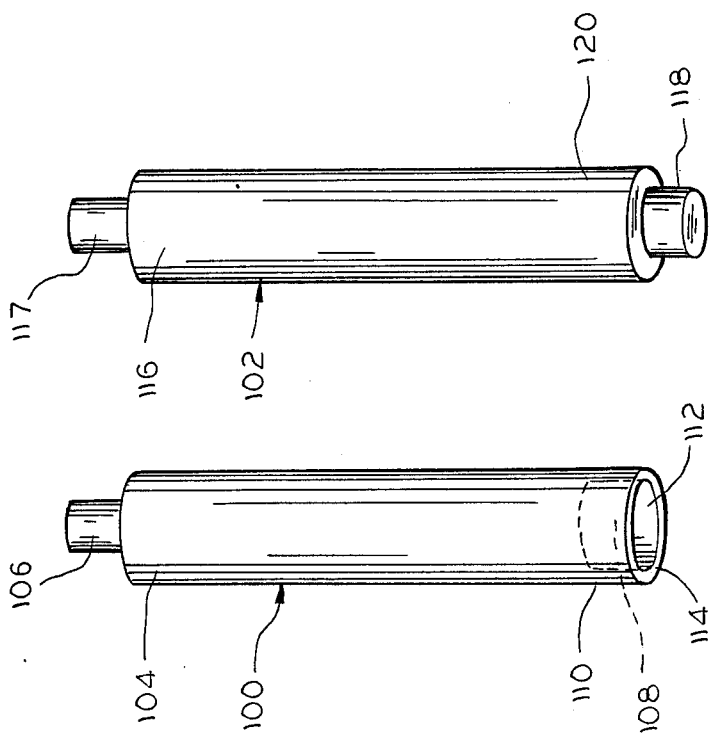

4,977,660

TOOL FOR REMOVING AND INSTALLING AN AUTOMOTIVE UNIVERSAL JOINT

BACKGROUND OF INVENTION

This invention relates generally to a tool for disconnecting a universal joint from a yoke or shaft and connecting a universal joint to a yoke or shaft. More specifically, the invention relates to a tool for releasing the coupling cap used for connecting a universal joint to a yoke or shaft, and for installing the coupling cap to connect the universal joint to the yoke or shaft. The universal joint is shaped in a "cross" configuration having four projections spaced 90 degrees apart.

Prior to the invention herein, it was extremely difficult and time consuming to release the coupling cap from its press fit association with the universal joint ("U-joint) and the yoke. Generally, the U-joint connected to the yoke with the coupling cap was secured in a vise and the area of the yoke encircling the opening containing the cap was continuously pounded. After much effort and the expenditure of substantial time, the coupling cap could be forced free. Frequently, the cost for expending such time and effort was just too great, and the connected joint would often be discarded as scrap.

The tool of the invention herein overcomes the prior problem and difficulty in disconnecting the U-joint from the yoke by providing positive and quick means for releasing the coupling cap from its press fit association with the U-joint and yoke, thereby disconnecting the U-joint from the yoke.

Moreover, in the past it was also difficult to install the coupling cap evenly in the press fit association with the U-joint and shaft, and at times the assembling precedure would damage the bearings around the outer end of the shaft, such as the fragile needle bearings.

Therefore, a primary object of this invention is to provide a tool for easily disconnecting the U-joint from an automotive yoke or shaft. A related object is to remove the coupling cap from its press fit association inside a yoke opening with a projection of the U-joint.

It is another primary object of the invention to provide a tool for easily connecting the U-joint to an automotive yoke or shaft. A related object is to evenly push the coupling cap into a press fit association with a projection of the U-joint.

SUMMARY OF THE INVENTION

In accordance with one embodiment of the invention, a tool is provided comprising a substantially "C" shaped frame having a side wall with a base plate extending outward from the bottom end and a bar support extending outward from the top end thereof. A plurality of holes are formed in the plate and a cylindrical opening is formed in the support bar. A rod is movably received in the opening in the bar. A cylindrical spring encircles the rod above the support bar. The spring is compressed when the rod moves downward in response to a downward force, and the spring returns the rod to an original position when the force is removed.

The bottom end of the rod includes a lip encircling an entrance into a bottom bore when the rod is used to release the caps from their press fit association with the U-joint. The lip impacts the area around the opening in the yoke containing said cap, to cause the coupling cap to free itself and move or pop into the bottom bore in the rod.

The bottom end of the rod may be a removable impact cup having said lip and said bottom bore and also an upper bore to receive the lower portion of the rod. The rod may be secured to the cup with a screw extending through a threaded aperture in the cup to the inside of the bore for tightening to the lower portion of the rod.

The bottom end of the rod includes a piston protruding outward when the rod is used to insert the caps into the press fit association with the U-joint. The piston contacts the cap and pushes the cap over the end of a projection of the U-joint and into said press fit association inside said opening.

The bottom end of the rod may be a removable push cup having said piston at the bottom end thereof, and also an upper bore to receive the lower portion of the rod wherein the push cup is secured to the rod.

In accordance with another embodiment of the invention, a cap removing push rod is used with an hydraulic press for removing the cap from its press fit association with the U-joint. The bottom of the cap removing push rod is similar to the aforedescribed impact cup and includes a bore extending inward from a circular lip. The lip contacts the yoke to encircle the opening containing the cap to be released. Upon applying sufficient pressing force with the hydraulic press, the cap is released and moves upward into the bore in the rod.

A cap inserting push rod is used with an hydraulic press for inserting the cap into a press fit association with th U-joint in the opening of the yoke. A piston extends outward in the downward direction from the bottom end of the cap inserting push rod and contacts the top of the cap to be inserted.

An alignment support positioned opposed to the piston having a push spring urges the U-joint upward and toward the piston. The cap is pushed into the yoke opening in response to the pressing force applied by the hydraulic press.

Therefore, a primary feature of the invention is to provide a rod having a bottom end including a bore extending inward from an outer lip to impact the area encircling an opening in the yoke containing the coupling cap in response to a downward force, to cause the cap to loosen and move upward into the bore of the rod.

Another feature of the invention is to provide a rod having a bottom end including a piston on the outer end to push the coupling cap inside the opening to press fit in the space between the side wall of the opening and a projection of te U-joint.

Another feature is to provide a support cup having a push spring for urging the U-joint upward as the coupling cap is being pushed into the opening.

Still another feature of the invention is to provide a pair of anvils removably positioned in a base plate, for supporting the U-joint and yoke in a fixed vertical position. A related feature is to provide anvils that are rotatably associated in said base plate.

Still another feature is to provide a base plate having a plurality of holes formed therein to removably receive the anvils, so that the spacing between anvils may be varied.

BRIEF DESCRIPTION OF THE DRAWINGS

Referring to the drawings in which the same characters of reference are employed to indicate corresponding similar parts throughout the several figures of the drawings:

FIG. 1 is a perspective view of the tool when used to remove the universal joint from the yoke, and embodying the principles of the invention;

FIG. 2 is a side exploded view of the tool in FIG. 1;

FIG. 3 is a side view of the contact cup used for pushing the cap into a press fit association with the universal joint and the yoke;

FIG. 4 is a side view of the alignment suppport and showing the spring spaced above;

FIG. 5 is a side sectional view of the tool when used to dislodge the coupling cap from its press fit association with the U-joint and yoke;

FIG. 6 is a side sectional view similar to FIG. 5 and showing the coupling cap partially removed from the U-joint and yoke;

FIG. 7 is a perspective view of the U-joint positioned in the yoke and showing the coupling cap spaced above the yoke opening after being dislodged from its press fit association;

FIG. 8 is a side sectional view of the tool when used to push the coupling cap into a press fit association with the the U-joint and the yoke;

FIG. 9 is a side sectional view similar to FIG. 8, and showing the coupling cap being pushed into the opening of the yoke and over the projection of the U-joint;

FIG. 10 is a perspective view of a cap loosening rod for use with an hydraulic press;

FIG. 11 is a perspective view of a cap push rod for use with an hydraulic press; and FIG. 12 is a perspective view of an hydraulic press which may be used with the rods of FIGS. 10 and 11 for removing and inserting the coupling cap for respectively disconnecting and connecting the U-joint to the yoke.

FIG. 13 is a perspective view of a cap installing push rod.

DESCRIPTION OF THE PREFERRED EMBODIMENT

Referring now more particularly to FIGS. 1,2,5,6 and 7, the reference numeral 10 indicates generally a tool embodying the principles of the invention when used for removing the universal joint ("U-joint") 12 (FIG. 7) from the yoke 14 or other type shaft, which may be used in an automotive or truck frame. The yoke 14 comprises a shaft 16 integrally formed to a substantially "U" shaped end 18 having opposed arms 20,22. An opening 23 is formed in the outer end 24 of each of the yoke arms 20,22.

The U-joint 12 includes a pair of opposed projections 25,26 and a second pair of opposed projections 27,28, and each projection is substantially 90 degrees apart. Coupling caps 30 are positioned over the projections 25,26,27 and 28 of the U-joint 12, and press fitted inside openings 23 of the yoke 14 for connecting the U-joint to the yoke.

Each cap 30 includes a hollow inside 32 and a flat top 34. Thus, as may be seen from FIGS. 5,6 and 7 the caps 30 are positioned over projections 25 and 26 of the U-joint 12 and fitted inside the openings 23 formed in the outer ends 24 of the arms 20,22 of the yoke 14. Similarly, caps 30 may cover the projections 27,28 and fitted inside openings, for example, of another yoke 14 or an automotive drive shaft (not shown). Hence, the cap 30 is sandwiched between the projection 25 of the U-joint 12 and the side annular defining wall 36 for the yoke opening 23.

The tool 10 comprises a substantially "C" shaped frame 38 including a base plate 40 and a support bar 42 extending outward from a side wall 43. The bar 42 is spaced above the base plate 40. A plurality of spaced apart holes 44 are formed in the base plate 40 for removably receiving the foot 46 of an anvil 48. The foot 46 is rotatable inside the holes 44. The support bar 42 includes a cylindrical opening 49 for slidably receiving a cylindrical rod 50.

The anvil 48 has a substantially rectangular shape having a flat upper end 51 for supporting the projections 27,28 of the U-joint 12 or of a yoke or shaft which may be attached to the projections 27,28 (but the projections 27,28 are shown unattached in the drawings) at a fixed vertical level.

The rod 50 includes an annular strike head 52 integrally formed to a cylindrical body portion 54. The strike head 52 includes a flat outer end 56. The body 54 of rod 50 is spaced inward from the side circular edge 55 of head 52 to form an annular shoulder 58 and extends downward from the head 52. The cross-sectional area of the cylindrical body 54 is less than the cross-sectional area of the opening 49 in the bar 42, but the cross-sectional area of the strike head 52 is greater than the cross-sectional area of the opening 49, so that the shoulder 58 may function as a stop for the downward movement of the rod 50.

A spring 60 encircles the body 54 of rod 50 and lies between the shoulder 58 of the push rod and the upper surface 61 of the support bar 42 of the frame 38. The horizontal or lateral length of the spring 60 is greater than the diameter of the opening 49 in the bar 42.

The holes 44 in the base plate 40 may be of different sizes and the distances between holes 44 may be varied. This enables different sized anvils 48 or the same anvils 48 to be used for supporting various types of U-joints, yokes, shafts etc.

The bottom end 62 of the rod 50 is recessed inward to define a neck portion 64 extending upward from a circular base 66. A cylindrical impact cup 68 is removably secured to the bottom end 62 of the rod 50.

The cup 68 includes an upper bore 70 and a lower bore 72 separated by a partition wall 73. The upper bore 70 is dimensioned to receive the neck 64 of the rod 50 with the base 66 bearing against the bottom surface 74 defining the upper bore 70. A threaded aperture 76 is formed through the cylindrical wall 77 of the cup 68 to receive a thumb screw 78 for tightening the cup 68 against the neck 64 of the rod 50.

The lower bore 72 of the cup 68 is dimensioned to receive the cap 30 when the cap 30 is loosened and freed from its association with the U-joint 12 and the yoke 14. A bottom lip or end 80 of the cup 68 is circular and flat and encircles the entry leading into the lower bore 72. The lip 80 impacts the portion of the outer end 24 of the yoke 14 circumscribing the the opening 23 to release the cap 30 from inside the opening 23 of the corresponding arm 20 or 22 of the yoke 14, and cause the cap 30 to move into the space of the lower bore 72.

Referring now more particularly to FIGS. 3,4,8,9 and 10 of the drawings, the reference designation 10a indicates generally a tool embodying the principles of the invention when used for press fitting the cap 30 into the space 31 (FIG. 8) between the defining wall 36 of the opening 23 in the arm 20 of the yoke 14 and projection 25 of the U-joint 12, for connecting the U-joint to the yoke 14 or other type shaft. All the component parts of the tool 10a are the same as the tool 10 except the impact cup 68 is replaced with a contact cup 82 (FIG. 3) and a resilient alignment support 84 (FIG. 4).

The contact cup 82 includes a bore 85 having substantially the same defining structure as the upper bore 70 of cup 68, to receive the neck 64 of the rod 50 with the circular base 66 of the rod 50 bearing against the bottom surface 86 on the inside of the bore 85. A threaded aperture 88 is formed through the cylindrical wall 89 of the cup 82 to receive the thumb screw 78 for tightening the cup 82 against the neck 64 of the push rod 50.

A piston 90 is integrally formed to the bottom wall 91 of the cup 80 and extends downward therefrom (FIG. 3). The piston 90 is vertically positioned and has substantially the same diameter as the cap 30. The outer or bottom end 92 of the piston 90 abuts the flat top 34 of the cap 30.

When force is applied to the strike head 52 for moving the rod 50 downward, the force of piston 90 contacting the cap 30 pushes the cap 30 downward to press fit between the defining wall 36 of the opening 23 and the projection 25. The movement of the rod 50 downward also forces projections 27,28 into contact with the upper end 51 of the anvils 48 which support the U-joint in a fixed vertical level as the cap is pushed in place.

The alignment support 84 (FIG. 4) includes a support cup 94 having a bore 95 to receive a compressible cylindrical spring 96. The alignment support 84 rests on the base plate 40 between the anvils 48. If the projection 26 has not been press fitted inside the opening 23 of arm 22 of the yoke, the projection 26 is inserted inside the spring 96. The spring 96 urges the U-joint upwardly so that the top 34 of the coupling cap contacts the outer end 92 of the piston 90.

Upon striking the strike head 52, the outer end 92 of the piston 90 pushes the cap 30 into a press fit association with the U-joint and the yoke. The resilient force of spring 96 pushes the U-joint upward in proper alignment for evenly pushing the cap in place. After the cap has been pushed in place, the outer end 24 of the opposite arm 20 is placed on top of the spring 96 when another coupling cap 30 is being inserted in opening 23 of arm 22.

Turning now more particularly to FIGS. 11, 12 and 13, another embodiment of the invention will be described. An hydraulic press indicated generally by the reference numeral 98 may be used for providing the force for removing and inserting the coupling caps 30. A cap removing push rod 100 is used to dislodge the cap 30 from its association with the U-joint 12 and the yoke 14, and a cap installing push rod 102 is used for connecting cap 30 to the U-joint and the yoke.

The cap removing push rod 100 (FIG. 12) includes an upper end 104 having a centrally positioned finger 106 extending outward therefrom for attaching by conventional means to the vertical movable head 107 of the hydraulic press 98. A receiving cup 108 is formed at the bottom end 110 of the push rod 100 having an opening 112 extending inward from a flat circular lip 114. The cap removing push rod 100 functions as the rod 50 and cup 68 in the embodiment illustrated in FIGS. 5 and 6.

The cap installing rod 102 (FIG. 13) includes an upper end 116 also having a finger 117 extending outward therefrom for attaching to the vertical movable head 107 of the hydraulic press 98. A piston 118 is integrally formed to and extends outward from the bottom end 120 of the rod 102. The cap installing rod 102 functions as the rod 50 and may be used with support cup 94 and spring 96 as shown in FIGS. 8 and 9.

When using the cap removing push rod 100 (FIG. 12) or the cap installing push rod 102 (FIG. 13), the projections 27, 28 of the U-joint are supported by the pair of anvils 48 removably positioned in a base plate 122 having a plurality of holes 124. The base plate 122 may be similarly constructed as the base plate 40 of the "C" frame 38.

To remove the cap 30, the finger 106 of push rod 100 (FIG. 12) secured to the head 107 of the hydraulic press 98. The push rod 100 is moved downward so that the lip 114 is in contact with the portion of the outer end 24 of the arm 20 of yoke 14 circumscribing the opening 23. The downward pushing force of the press 98 acting on the yoke arm 20 located at a fixed vertical level(supported on the anvils 48), causes the cap 30 to dislodge from the opening 23 and from its press fit association with the U-joint and yoke, and finally the cap 30 moves outward in the opposite direction as the force from the press 98 and is received in the bore 112.

To insert the cap 30, the finger 117 of push rod 102 (FIG. 13) is secured to the hydraulic press 98. The cap 30 is placed on top of the outer end 24 of arm 20 of the yoke 14 and is manually pressed into opening 23. The push rod 102 is moved downward so that the outer end 120 of the piston contacts the top 32 of the coupling cap 30. The downward force from the press 98 forces the cap 30 downward in the space 31 between the projection 25 and the defining wall 36 for opening 23 to provide the connection of the U-joint and the yoke.

Removing Universal Joint from Yoke

To remove the universal joint 12 from the yoke 14, the caps 30 must be freed from their association with the yoke and the U-joint. As may be seen in FIG. 5, the cap 30 is tightly engaged inside the opening 23 in the outer end 24 of arm 20 of the yoke 14, and sandwiched in the annular space between the side wall 36 in the opening 23 and the projection 25. The cap 30 also covers the outer end of the projection 25.

The foot 46 of one anvil 48 is inserted inside the hole 44 in the base plate 40 and another foot 46 of another anvil 48 is inserted inside another hole 44 in the base plate 40, separated a distance suitable for supporting the opposite projections 27,28 of the U-joint 12 at a fixed vertical level, as shown in FIGS. 5 and 6.

The spring 60 is positioned over the body 54 of the rod 50 and the lower portion of rod 50 is passed through the cylindrical opening 49 in the bar 42 of the "C" frame 38, so that the spring 60 lies between the shoulder 58 of the strike head 52 and the upper surface 61 of the support bar 42.

The bottom end 62 of the rod 50 is positioned inside the upper bore 70 of the impact cup 68, so that the circular base 64 contacts the bottom surface 74. The thumb screw 78 is tightened against the neck 64 of the bottom end 62 of the push rod 50. Now the tool 10 is set up as shown in FIG. 5 and assembled for dislodging the cap 30 from inside the opening 23 in the arm 20 of the yoke 14.

The outer end 56 of the strike head 52 of the rod 50 is struck with a hammer (not shown) or other suitable impact tool so that the rod 50 moves downward from an initial or normal position compressing the spring 60 against the outer surface 61 of the bar 43. The bottom lip end 80 of the impact cup 68 impacts that portion of the outer end 24 of the yoke arm 20 encircling the opening 23. Since the impact of the cup 68 against the yoke 14 cannot force the yoke 14 or the U-joint 12 in a downward direction due to the firm fixed, vertical support provided by the anvils 48 positioned in the base plate 40, the cap 30 reacts in the upward direction and toward the lower bore 72 of the cup 68.

After the applied force is removed, the rod 50 is urged upward as the resilient force of the spring 60 expands the spring outward against the shoulder 68 of the strike end 52, to position the rod 50 in its normal or initial position ready for the next hammer blow. After successive blows against the strike head 52, the impact of the outer end 80 of the cup 68 against the outer end 24 of the yoke finally causes the cap 30 to loosen and move or pop into the cylindrical or annular space of the lower bore 72, freeing itself from its sandwich association between the projection 25 of the U-joint 12 and the side wall 36 defining opening 23 in arm 20 of the yoke 14.

The yoke is reversed in position so that the projection 26 of the U-joint and the arm 22 are positioned in the upward direction facing the impact cup 68, for dislodging the cap 30 press fitted between the side wall 36 for the opening 23 in the outer end 24 of the arm 22 and the projection 26. The yoke 14 and the U-joint 12 are still supported on the anvils 48 by the projections 27,28. Now the tool 10 is set up for removing cap 30 from its association with the arm 22 of yoke 14, to fully disconnect the U-joint from the yoke.

The caps 30 may also be released from their press fit association with the U-joint and yoke by using the cap removing push rod 100 (FIG. 12) with the hydraulic press 98, to provide the downward impacting or pressing force. The finger 106 is secured to the head 107 of the press 98. The push rod 100 may be lowered so that the lip 114 is in circumscribing contact around the opening 23 in the outer end 24 of the yoke arm 20, and the bore 112 is aligned with the opening 23. Then a sufficient downward pressing force is applied by the lip 114 of push rod 100 to cause the cap 30 to free itself from its press fit association and move into the bore 112.

Connecting Universal Joint to Yoke.

To connect the universal joint 12 to the yoke 14, the caps 30 are connected to th U-joint 12 and yoke 14 in a press fit association. As may be seen in FIG. 8, the cap 30 should be pushed inside the space 31 between the side wall 36 defining the opening 23 formed in the outer end 24 of yoke arm 20 and the projection 25 of the U-joint.

The anvils 48 should be in place to support the U-joint and the yoke in a fixed vertical position. The alignment support 84 is positioned between the anvils 48 and rests on the base plate 40. The spring 96 extends inside the opening 23 in yoke arm 22 and the projection is received inside the spring 96 to urge the U-joint upward. The spring 60 encircles the body 54 of rod 50 between the shoulder 58 and the upper surface 51 of the bar 38.

The contact cup 82 is removably secured to the bottom end 62 of rod 50 inside the bore 85 upon tightening the thumb screw 78, so that the outer end 92 of the piston 90 is facing the top 34 of cap 30. The cap 30 should be forced or started into the entry into the opening 23. The spring 96 holding the projection 26 forces the U-joint upward so that the top 34 of cap 30 abuts the outer end 92 of the piston 90.

The outer end 56 of the strike head 52 of the rod 50 is struck with a hammer or other suitable impact tool to generate a downward force, so that the rod 50 moves downward bringing projections 27,28 in contact with the anvils 48, and the piston 90 pushes the cap 30 downward into the space between the side wall 36 of the opening 23 and the projection 25. The downward force compresses the spring 60, and after the force has dissipated, the spring 60 resiliently pushes the rod 50 upward back to its normal or initial position - ready for another strike. Finally, the cap 30 has been fully pushed into its press fit association inside opening 23 of the yoke arm 20, to thereby connect the U-joint with the yoke.

Similarly, the cap 30 is press fit in the space 31 between the side wall 36 of opening 23 of yoke arm 22 and the projection 26 of the U-joint, and thereby fully connecting the yoke 14 to the U-joint 12.

The caps 30 may also be pushed into their press fit association with the U-joint and yoke by using the cap installing push rod 102 (FIG. 13) with the hydraulic press 98 to provide the downward push force. The finger 117 is secured to the head 107 of the press 98. The push rod 102 may be lowered so that the outer end of piston 118 contacts the top 34 of cap 30. Then sufficient downward pressing force provided by the press 98 is applied by the push rod 102, to cause the cap 30 to be pushed in the space 31 between the side wall 36 inside opening 23 and the projection 25 for connecting the U-joint to the yoke 14. Similarly the push rod 102 may be used for press fitting the cap 30 over projection 26 and inside the opening 23 in yoke arm 22.

Various modifications of the invention of a tool for disconnecting the U-joint from the yoke and connecting the U-joint to the yoke described herein, the scope of which is limited solely and defined by the appended claims.

I claim:
1. A tool for removing and inserting a coupling cap inside an opening in an arm of a yoke to respectively disconnect and connect the universal joint to the yoke, said cap operatively covering the outer end of one of the projections of th U-joint and being in a press fit association in said opening between the side wall defining said opening and the projection of the U-joint, and said tool comprising:
   a frame including a base and a bar spaced from the base, said bar having a cavity formed therethrough;
   a pair of spaced apart anvils removably associated with said base, said U-joint and yoke being supported on said anvils in a fixed position;
   a rod having an outer end section, an inner end section and a body section therebetween, said rod being movably received in said cavity of said bar;
   an impact cup having an inner bore and a outer bore;
   means for removably securing the inner rod section in said outer bore;
   said impact cup including a lip encircling an entrance into said inner bore when the tool is used to disconnect the U-joint from the yoke;
   said lip of the cup forceably impacting an area of the arm of the yoke circumscribing the opening containing said cap in response to the application of an external force to said rod to release said cap from said press fit association and cause said cap to move outwardly and into said inner bore; and
   an elongated spring encircling the body of said rod and positioned between said bar and the outer end portion of the rod to hold the rod in a normal posi- tion spaced from the yoke, said spring compressing between said bar and said outer end portion of the rod as said rod is moved inward for impacting said area, said spring expanding after said force is removed to return said rod to said normal position; and the lower end of the rod including a piston removably attached to the inner end portion of the rod when the tool is used for connecting the U-joint to the yoke, said piston pushing said cap in said press fit association inside said opening in the yoke in response to said application of said force to said rod.

2. A tool for removing and inserting a coupling cap inside an opening in an arm of a yoke to respectively disconnect and connect the universal joint to the yoke, said cap covering the outer end of one of the projections of the U-joint and being in a press fit association inside the opening between the side wall defining said opening and the projection of the U-joint, and said tool comprising:

a base plate having a plurality of holes; and
a pair of anvils, each of said anvils including a body having a top end, a bottom end and a foot extending outward from the bottom end, said foot of each of said anvils being removably positioned in one of said holes to provide the desired spaced distance between said anvils:
a rod means including an upper end section, a lower end section and a body section therebetween;
the lower end section of said rod including a lip encircling an entrance into a bottom bore when the tool is used to disconnect the U-joint from the yoke;
said lip forceably impacting an area of the arm of the yoke circumscribing the opening containing said cap in response to the application of a downward force to said rod, to release said cap from said press fit association and cause said cap to move upwardly and into said bottom bore; and
the lower end section of the rod including a piston when the tool is used for connecting the U-joint to the yoke, said piston pushing said cap in said press fit association inside said opening in the yoke in response to said application of said downward force to said rod.

3. The tool of claim 2 when used to disconnect the U-joint from the yoke includes:
said lower end section of the rod including an impact cup having said bottom bore and a top bore;
said body section having a lower portion positioned in said top bore;
a threaded opening formed in the impact cup in communication with said top upper bore; and
a screw extending into said top bore for tightening against said lower portion of the body of said rod.

4. A tool for removing and inserting a coupling cap inside an opening in an arm of a yoke to respectively disconnect and connect the universal joint to the yoke, said cap covering the outer end of one of the projections of the U-joint and being in a press fit association in said opening between the side wall defining said opening and the projection of the U-joint, and said tool comprising:

support means for supporting said U-joint and yoke in a fixed vertical position;
a rod having an upper end section, a lower end section and a body section therebetween;
the lower end section of said rod including a lip encircling an entrance into a bottom bore when the tool is used to disconnect the U-joint from the yoke;
said lip forceably impacting an area of the arm of the yoke circumscribing the opening containing said cap in response to the application of a downward force to said rod, to release said cap from said press fit association and cause said cap to move upwardly and into said bottom bore;
the lower end of the rod including a piston extending outward therefrom when the tool is used for connecting the U-joint to the yoke, said piston pushing said cap in said press fit association inside said yoke opening in response to said application of a downward force to said rod;
a support cup having a hollow inside; and
a spring positioned in said hollow inside and extending outward therefrom, said spring pushing upward on the U-joint when the coupling cap is being pushed downward into said yoke opening.

5. A tool for removing a coupling cap in a press fit association inside an opening in the arm of a yoke to disconnect the universal joint from the yoke, and said tool comprising:
a base plate having a plurality of holes;
a pair of spaced apart anvils on which said U-joint and yoke are supported, each of said anvils including a body portion having a top and bottom; and
a foot extending outward from said bottom of each of said anvils and removably received in one of said holes to provide the desired spaced distance between said anvils;
a rod means having an upper end section, a lower end section and a body section therebetween; and
the lower end of said lower end section of the rod including a lip encircling an entrance into a bottom bore, said lip foreceably impacting the area of said arm of the yoke surrounding said opening containing said cap in response to the application of a downward force to said rod means to cause said cap to be released from said press fit association in the yoke opening and move upward into said bottom bore.

6. The tool of claim 5, wherein said foot of the anvil is rotatably received in said hole in said base plate.

7. The tool of claim 5
said lower end section of the rod including an impact cup removably attached to the body section of the rod, said impact cup including a bottom end having said lip encircling the entrance into said bottom bore;
a top bore formed inward from the top of the impact cap to receive the lower portion of the body section;
a threaded aperture extending through said impact cup in communication with said top bore; and
a screw received in said aperture for securing the lower portion of the rod body to said impact cup.

8. The tool of claim 7 includes:
a frame including a horizontal support bar having a cavity formed therethrough, said rod passing through said cavity;
a spring encircling said rod above the bar and having a horizontal length greater than the diameter of said cavity of said bar opening, said spring compressing when said downward force is applied to said rod and returning said rod to a normal position after said downward force is removed;

the outer end of said rod means including a strike head;

the body section of the rod means being recessed inward from the strike bead to define a shoulder therebetween, the outer end of said spring abutting said shoulder when said spring is depressed; and the lower portion of said rod body including a base to bear against the bottom surface defining said upper bore and a neck portion recessed between the base and the remainder of the rod body, said screw tightening against said neck.

9. A tool for inserting a coupling cap in a press fit association inside an opening in the arm of a yoke between the side wall defining said opening and one of the projections of the universal joint to connect the U-joint to an automotive shaft and comprising:

support means for supporting said U-joint shaft in a fixed vertical position;

a rod having an outer end, an inner end and a body section therebetween;

the inner end of said rod including a piston extending outward therefrom, said piston pushing said cap in said press fit association inside said yoke opening in response to an inward force acting on said rod;

a support cup having a hollow inside; and a spring positioned in said hollow inside and extending outward therefrom, said spring pushing outward on the U-joint when the coupling cap is being pushed inward into said shaft opening in the arm of the yoke.

10. The tool of claim 9, wherein said support means includes a pair of spaced apart anvils comprising a body having a top end and a bottom end, said support cup being positioned between said anvils, said spring being associated with the projection of the U-joint opposite to the U-joint projection being connected in said press fit association with said cap, said anvils supporting the projections of the U-joint displaced 90 degrees from the projection being connected in said press fit association.

11. The tool of claim 10, wherein:

said spring associated with said support cup having a horizontal dimension less than the diameter of said opening in the yoke shaft arm to extend inside said opening, said spring having a central hole to receive a projection of the U-joint opposite to said one projection being connected to the yoke arm with said cap.

* * * * *